Oct. 14, 1947.   W. F. REICHELDERFER   2,428,993
HEAT EXCHANGER
Filed Dec. 11, 1943

INVENTOR.
Wilton F. Reichelderfer
BY
Spencer Hardman and Fehr
Attorneys

Patented Oct. 14, 1947

2,428,993

UNITED STATES PATENT OFFICE 2,428,993

HEAT EXCHANGER

Wilton F. Reichelderfer, Oakwood, Ohio, assignor to General Motors Corporation, Dayton, Ohio, a corporation of Delaware Application December 11, 1943, Serial No. 513,826

1 Claim. (Cl. 257—246)

This invention relates to heat exchange structures such as may be used in absorption refrigerating systems and many other heat exchange applications.

There are many instances where it is desirable to provide efficient heat exchange between fluids especially gases including the normally permanent gases carrying vapors. One example of such application of heat exchange is in the partial pressure type of the absorption refrigerating system wherein the warm hydrogen flowing to the evaporator is brought into heat exchange relation with the mixture of cold hydrogen and ammonia vapor flowing out of the evaporator.

It is an object of my invention to provide a more efficient and inexpensive heat exchange structure for gases and particularly gases carrying vapors and partially condensed vapors.

It is another object of my invention to provide a more efficient and inexpensive heat exchange structure for gases wherein any condensed vapor carried by the gas will be evaporated to provide added heat exchange efficiency.

It is still another object of my invention to provide a more efficient and inexpensive heat exchange structure which employs excellent capillary and heat transfer properties of wire material to the best advantage.

These objects are attained in the example of my invention illustrated, by providing a double tube-type of heat exchanger having a corrugated sheet of matted wire mesh between the two tubes and within the inner tube with the corrugations extending helically in opposite directions. The wire material is so arranged that it is held by its own elasticity firmly in contact with both sides of the thin inner tube member. I find that this wire material efficiently carries the heat from one of the gases to the inner tube member to the other gas. The wire material also causes turbulence of the gases flowing through the heat exchanger which increases the rate of heat transfer. Also any particles of condensed vapor in the colder gas collect upon the capillary wire material and are evaporated by the turbulence of the gas flowing through the structure to provide added heat exchange efficiency.

Further objects and advantages of the present invention will be apparent from the following description, reference being had to the accompanying drawings wherein a preferred form of the present invention is clearly shown.

Figure 1:
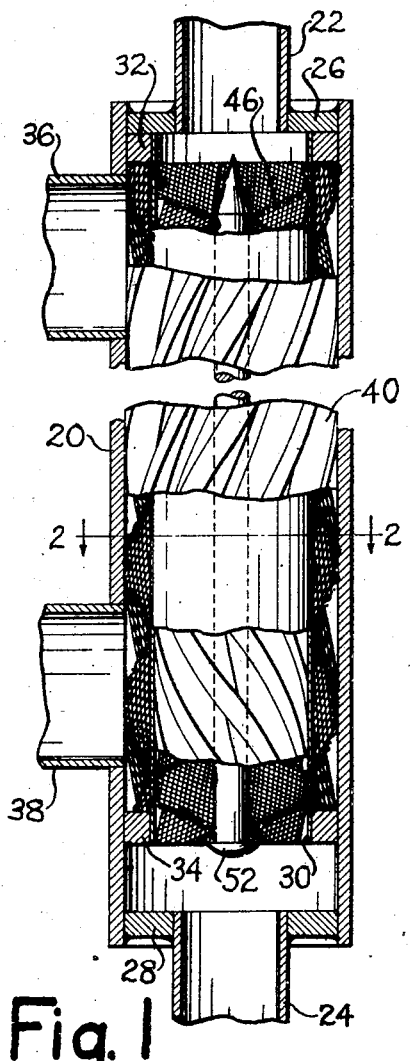
Fig. 1 is a sectional view taken along the line 1—1 of Fig. 2, of a heat exchanger incorporating one form of my invention.
Figure 2:
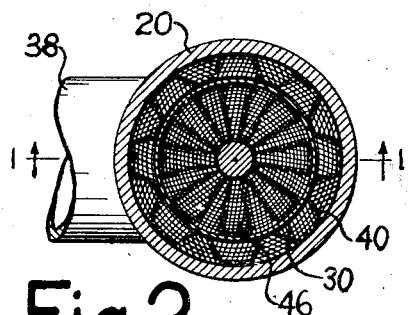
Fig. 2 is a sectional view taken along the line 2—2 of Fig. 1.

Referring now to the drawings and more particularly to Figs. 1 and 2, there is shown a heat exchanger including an outer tubular member 20 which is connected at its opposite ends to the tubes 22 and 24. The connection between the tube 20 and the tube 22 is sealed by the end plate 26 while the connection of the tube 20 with the tube 24 is sealed by the end plate 28. Within the outer tube 20 is a thin cylindrical inner tube 30 which may be of the best heat conducting material which is satisfactory from the standpoint of corrosion resistance and cost. If the difference in pressure between the gases is not great, as is the case in an absorption refrigerating system between the gases flowing into and out of the evaporator, this inner tube may be made very thin so that the resistance to the conduction of heat through it is small and as a consequence in such a case, the specific conductivity of the tube material is not so important. In such a system it is desirable that steel be used, from the standpoint of good corrosion resistance and low cost. This thin inner tube 30 is held at its upper and lower ends by the rings 32 and 34 which extend between it and the outer tube 20 and thereby seal the ends of the passage between the inner and outer tubes 30 and 20. This passage between the inner and outer tubes 30 and 20 is tapped at the upper and lower ends by the upper and lower tubes 36 and 38, which fit into apertures provided in the wall of the outer tube 20.

The structure described so far in detail, provides a simple and inexpensive heat exchanger which may be satisfactorily used for heat exchanging liquids; but inasmuch as gases have a very low specific heat there is not sufficient surface to provide good heat exchange between gases and also there is not sufficient turbulence to bring the gases on opposite sides of the inner tube into intimate contact with the opposite walls of the inner tube.

Figure 4:
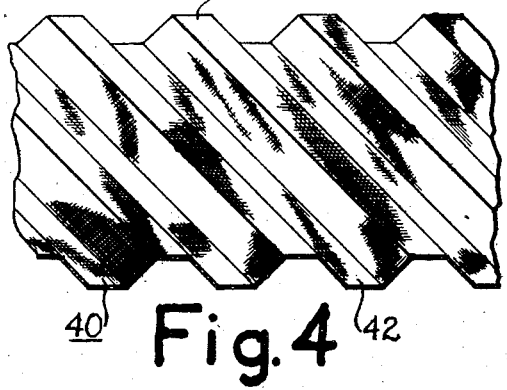
Fig. 4 is a diagrammatic perspective view of the development of the wire member located between the inner and outer tubes of the heat exchanger.
Figure 5:
Fig. 5 is an enlarged view of the knitted wire mesh which is used to form the wire members shown in Figs. 3 and 4.

In order to provide improved heat exchange I take advantage of the great amount of surface and the excellent heat transfer properties which may be obtained by wire mesh, particularly wire mesh of the knitted form shown in Fig. 5. This form may be knitted in many different sizes, from very small to quite large and which may be made of many different gauges of wire so that a wide selection of heat exchange properties is available from this type of material. It has the feature that all the wires extend from one edge to the opposite edge. In addition it is possible to use stranded wire instead of single wires in the mesh. The mesh shown in Fig. 5 is exaggerated in size and in practice I prefer to use a much smaller size mesh and to mat it together by placing several layers together in random fashion to form a matted sheet. Such material has excellent capillary and heat transfer properties. After this I take such a sheet of matted wire mesh and corrugate it at an angle to the edges substantially into the form of sheet shown in Fig. 4 and designated by the reference character 40. The extremities 42 and 44 of the corrugations are made substantially flat.

Figure 3:
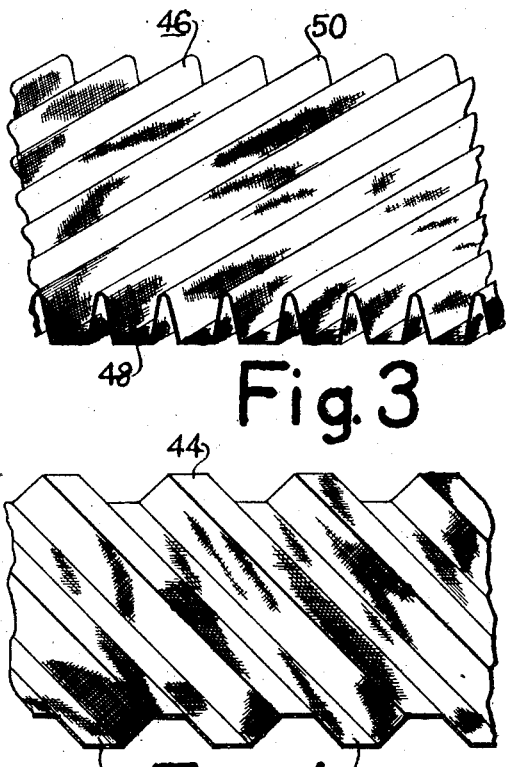
Fig. 3 is a diagrammatic perspective view of the development of the wire member provided within the inner tube.

A second sheet of knitted matted wire mesh similar to the sheet used for Fig. 4, is corrugated with the type of corrugations shown in Fig. 3, extending at an angle through the sheet which is transverse to the angle of the corrugations in Fig. 4. In the sheet 46, shown in Fig. 3, the extremities 48 of the corrugations are flatted while the extremities 50 may be rounded as shown, or they may be bent sharply. Because of the fact that the sheets shown in Figs. 3 and 4 are of wire mesh they can be rolled so that the corrugations extend in the form of a helix without great difficulty. By arranging the helicies at different angles, the rate at which the gases flow through the heat exchanger may be varied separately so as to secure the best possible rate. The closeness of the corrugations as well as their angles may be varied in accordance with the specific weight, pressure and viscosity of the gases used.

In assembling the heat exchanger, the corrugated sheet 40, preferably slightly greater in size than would fit easily within the tube 20, is rolled up so that the corrugations extend helically in the roll and this roll is then forced into the outer tube 20. In so doing the outer extremities 42 become rounded to the shape of the inside of the tube 20, and are forced tightly against the inner walls of the tube 20. The rolling of the sheet 40 also provides the extremities 44 of the corrugations with a concave surface which will fit snugly the outer surface of the inner tube 30.

The corrugated sheet 46 is also rolled up in such a way that the corrugations extend helically with the extremities 48 of the corrugations rounded thereby and on the outside of the roll. This roll made up of sheet 46 is then forced into the inner tube 30 and then a long pin 52 with a conical point at one end is pushed into the center of the roll of the sheet 46 between the inner extremities 50 so as to force the rounded outer extremities 48 firmly into contact with the interior walls of the inner tube 30. After this the inner tube 30 is forced into the inside of the corrugated sheet 40 which is already lodged within the outer tube 20. The resiliency of the corrugated sheet 40 will allow the inner tube 30 to be slightly larger than the space provided for it by its natural condition, so that the tube 30 presses tightly against the inner extremities 42 of the corrugations of the corrugated sheet 40. After this the end rings 32 and 34 may be put into place and fastened if necessary, by some form of bonding, or suitably rolling the tubing and finally the end plates and end tubes and the side tubes 36 and 38 may be connected in place.

With this heat exchanger one of the gases will flow from the tube 22 helically through the corrugations of the wire member 46 surrounding the pin 52 within the inner tube 30 to the tube 24. The other gas will flow from the tube 38 into the space between the inner and outer tubes 30 and 20 and will flow through the corrugations of the outer wire member 40 in an opposite helical path to the upper tube 36. This will give good counterflow heat exchange between the two gases. The flow of each of the gases, however, may be reversed if desired. The matted wire mesh material used in this heat exchange structure has capillary properties and tends to cause the condensation of the vapor and to collect the minute amounts of condensed vapor from the colder gas. It also causes turbulence of the gas flowing through the corrugations promoting evaporation of the condensed vapor into the gas to provide an additional cooling effect which gives added efficiency. The wires of the wire mesh material provide a great amount of surface or area of contact with the gas with a very low material cost and they transmit the heat readily to the thin inner tube 30 by which the heat is exchanged between the wire members. The corrugations of the wire members allow the gases to flow through them with little frictional resistance but this frictional resistance may be varied by varying the angle or lead of the corrugations. The proportions are very flexible in every case and may be proportioned in order to obtain the greatest efficiency from various gases, vapors and liquids which may be used. It is not necessary to use the knitted form of wire mesh shown in Fig. 5, but other forms may be used if desired.

While the form of embodiment of the invention as herein disclosed, constitutes a preferred form, it is to be understood that other forms might be adopted, as may come within the scope of the claim which follows.

What is claimed is as follows:

A heat exchange structure comprising a plurality of concentric tube portions, a wire member in the form of a corrugated sheet extending around the inner tube portion with the inner extremities of the corrugations in contact with the inner tube portion, said wire member being located within the outer tube portion, a second wire member in the form of a corrugated sheet extending around the walls within the inner tube with the outer extremities of the corrugations in contact with the interior surface of the inner tube, the corrugations of the wire members extending at acute angles to the edges of the corrugated sheets.

WILTON F. REICHELDERFER.

REFERENCES CITED

The following references are of record in the file of this patent:

UNITED STATES PATENTS

| Number | Name | Date |
|---|---|---|
| 1,854,619 | Mortensen | Apr. 19, 1932 |
| 2,016,746 | Ireland | Oct. 8, 1935 |
| 2,082,899 | Norris | June 8, 1937 |
| 2,112,743 | Poole | Mar. 29, 1938 |
| 2,157,744 | Welty | May 9, 1939 |
| 1,147,279 | Sweetland | July 20, 1915 |
| 1,118,237 | Saint Cyr | Nov. 24, 1914 |
| 1,752,670 | Kingman | Apr. 1, 1930 |

FOREIGN PATENTS

| Number | Country | Date |
|---|---|---|
| 371,608 | Great Britain | Apr. 28, 1932 |
| 430,015 | Great Britain | June 6, 1935 |
| 623,268 | Germany | Dec. 16, 1935 |